Aug. 6, 1940.    G. J. DASHEFSKY    2,209,960
TORSIONAL VIBRATION DAMPER
Filed July 20, 1938    4 Sheets-Sheet 1

INVENTOR
GEORGE JOSEPH DASHEFSKY
BY
Ransom K. Davis
ATTORNEY

Aug. 6, 1940.   G. J. DASHEFSKY   2,209,960
TORSIONAL VIBRATION DAMPER
Filed July 20, 1938   4 Sheets-Sheet 2

INVENTOR
GEORGE JOSEPH DASHEFSKY
BY
ATTORNEY

Aug. 6, 1940.  G. J. DASHEFSKY  2,209,960
TORSIONAL VIBRATION DAMPER
Filed July 20, 1938  4 Sheets-Sheet 3

INVENTOR
GEORGE JOSEPH DASHEFSKY
BY
ATTORNEY

Aug. 6, 1940.   G. J. DASHEFSKY   2,209,960
TORSIONAL VIBRATION DAMPER
Filed July 20, 1938   4 Sheets-Sheet 4
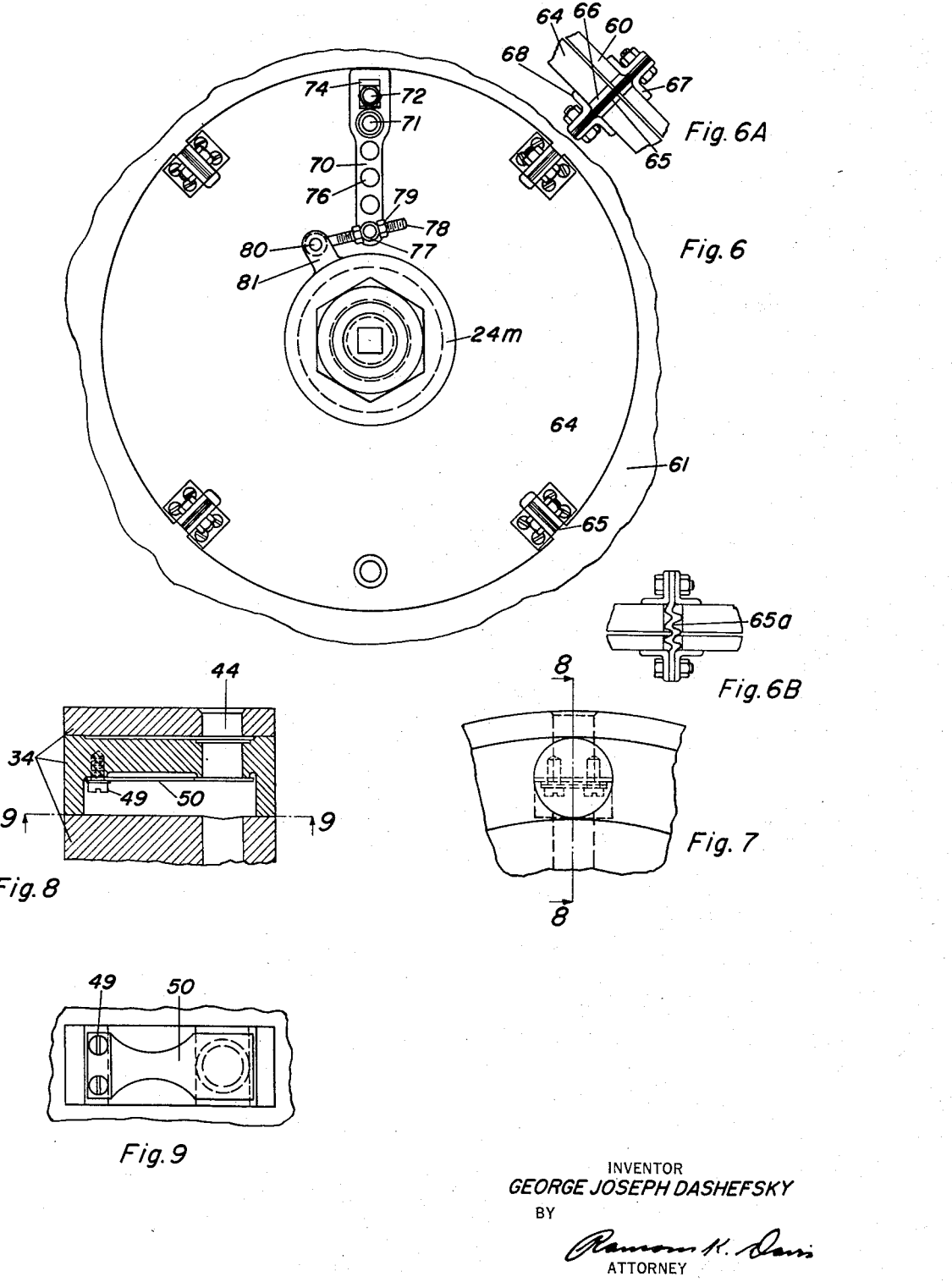
INVENTOR
GEORGE JOSEPH DASHEFSKY
BY
ATTORNEY Patented Aug. 6, 1940

2,209,960

UNITED STATES PATENT OFFICE 2,209,960

TORSIONAL VIBRATION DAMPER

George Joseph Dashefsky, Rockville Centre, N. Y.

Application July 20, 1938, Serial No. 220,408

8 Claims. (Cl. 74—574)

(Granted under the act of March 3, 1883, as amended April 30, 1928; 370 O. G. 757)

My present invention relates to method of and means for eliminating harmful torsional vibrations.

One of the primary objects of the present invention is to provide for a much greater dissipation of vibration energy than it has heretofore been possible to achieve, and thus make possible a great reduction in size and weight of the damping device. The devices of the prior art utilize a flywheel or inertia member acted upon by the vibration and which is required to do the actual work of dissipating vibration energy, thus demanding large flywheel masses and limiting the displacement of the connecting member to the same magnitude as the vibration itself. All of the energy dissipation must be accomplished in this very small displacement.

The present invention, however, utilizes the conventional flywheel merely to actuate a monitoring or relay valve which controls discharge pressures in a constant displacement pump having a rotor forming part of the rotating mass in which vibrations are to be damped. The pump does the actual work of damping and has a much greater angular displacement in which to dissipate the vibration energy. Thus, for a one-degree vibration occurring 5 times per revolution, the pump will have an angular displacement of $$\frac{360}{5} = 72 \text{ degrees}$$

for each of the five vibrations, whereas the flywheel will have but a one-degree displacement in which to dissipate the energy.

In the increasing speeds of rotary mechanism torsional vibrations become critical which were negligible in the same mechanism of lesser speed, and extensive investigation in former needless respects is essential to the obtainance of a high degree of efficiency, economy and safety.

With the employment of my invention the size, weight, space and cost of the rotary parts which are essential to commercial success with the structures and practices of the prior art may be reduced without lessening the factors of safety or inviting crystallization, deterioration, distortion or fracture-failure of the rotatable parts.

While I have disclosed but one form of apparatus for the most advantageous practice of my method, such disclosure will enable those skilled in the art to readily adapt many forms of existing apparatus for the suitable practice of my method, as well as to modify the form and structure of the disclosed apparatus for the obtainance of the same results and advantages.

My invention consists of the method and apparatus hereinafter more fully described and embraced in the appended claims.

In the drawings illustrating the form and structure of my invention with which I have attained advantageous results, Figure 1 is a top plan diagrammatic view of an internal combustion motor of usual construction to one end of the crankshaft of which the apparatus of my invention is attached.

Fig. 6 is a side elevation view looking toward the right side of Fig. 2 with that portion of the outer casing removed and the mechanism projecting from behind the same broken away.

Figs. 6A and 6B are side elevations of portions of the periphery of the device shown in Fig. 6, showing alternative forms of construction.

Fig. 7 is a side elevation view of a fragment adjacent the periphery of the pump body.

Fig. 8 is a sectional elevation view on line 8—8 of Fig. 7.

Fig. 9 is a view on line 9—9 of Fig. 8 of a portion of the pump body.

Figure 1:
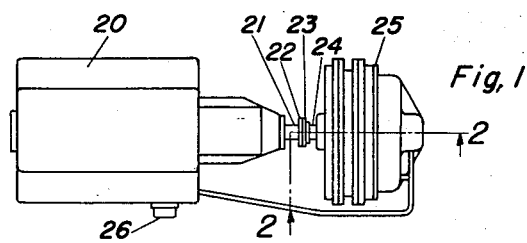

The form of apparatus in which I have embodied my invention and with which I have obtained advantageous results, is shown in the accompanying drawings and described as follows:

20 indicates an internal combustion motor of usual construction, Fig. 1, and has its hollow crankshaft 21 projecting from one end thereof and provided with a flange or other coupling means 22 associated with a like flange or coupling means 23 fixed to the end of shaft 24, projecting from a portion of the casing of my torsional vibration eliminator assembly 25. The motor 20 is provided with the usual pump 26, which is ordinarily driven by the cam shaft or the crankshaft of the motor, and pumps lubricating oil from the usual crankcase of the motor to its various points of application. Some of such points of application of the lubricating oil are the connecting rod bearings upon the wrist pins of the cranks of the crankshaft 21, through the hollow 27 of which the oil is applied to such bearings. This pump 26 I conveniently employ, and which may be of increased capacity, to supply lubricating oil from the hollow 27 of crankshaft 21 to the hollow 28 of shaft 24 of eliminator assembly 25. Shaft 24 is provided with suitable bearings 29 situated centrally in spaced apart circular plates 30 having peripheral annular flanges 31 extending toward each other and secured by bolts or otherwise to opposite surfaces of an intermediate ring 32 having a peripherally integral base 33 for supporting the eliminator assembly 25 upon a foundation in alignment with said shafts 21 and 24.

Intermediate the bearings 29 and plates 30, the shaft 24 is provided with a disc 34 rigidly attached thereto. This disc 34, for convenience of manufacture, may be formed of a plurality of annular circular ring laminations secured to each other and to the shaft 24. Circular plates 36 are eccentrically arranged, forming an oil-tight fit on each of the opposite sides of disc 34, with the peripheries of plates 36 secured oil-tight by bolts or otherwise, to a ring 37 whose circular inner surface is eccentric to the periphery of disc 34. Between rings 32 and 37 roller or other bearings 38 are formed of like eccentricity to disc 34. Where such bearings 38 are formed of rollers, intermediate rings 32 and 37, at least one of such rings 32 and 37 is provided with flanges 39 at opposite sides, Fig. 2, to confine the rollers 38.

Figure 3:
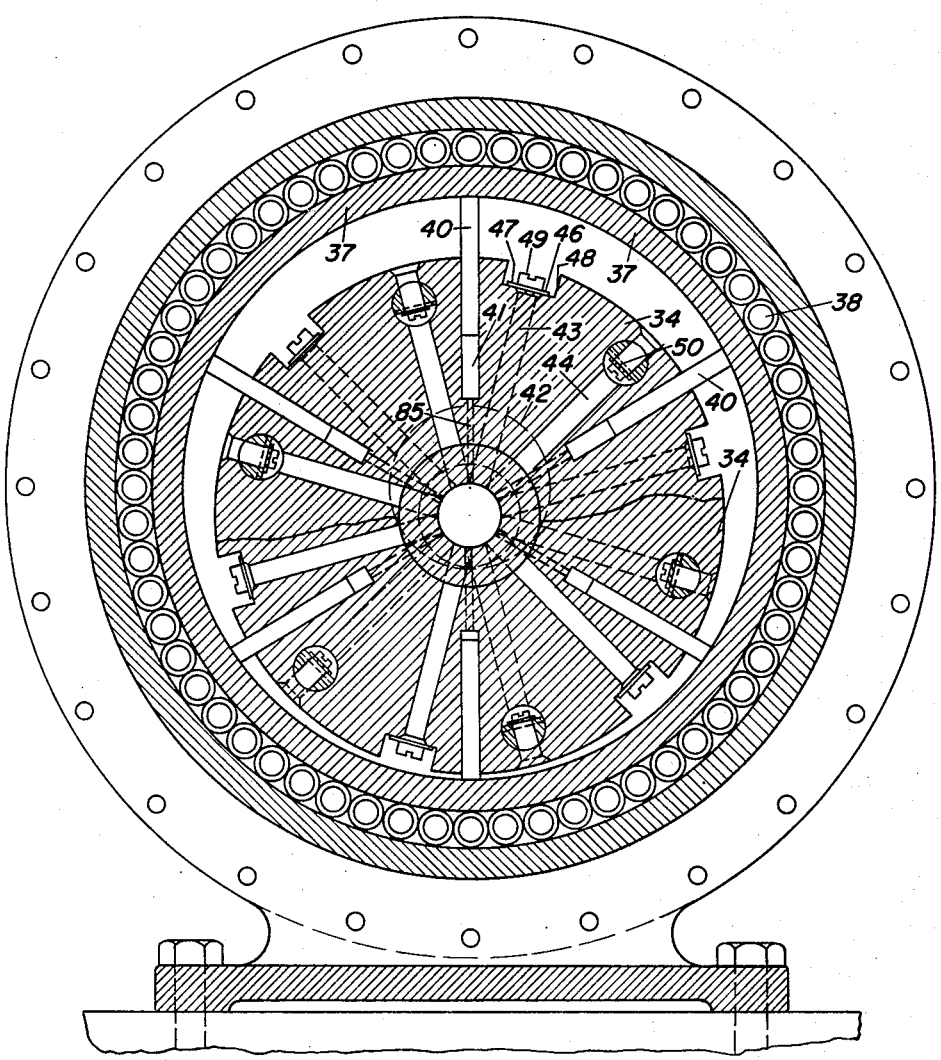
Fig. 3 is a sectional elevation view on line 3—3 of Fig. 2.

In the eccentric space between the ring 37 and disc 34, Fig. 3, a plurality of radial uniformly spaced apart paddle blades 40 are mounted, each slidably fitting into its slot 41 in disc 34, with the outer end and lateral surfaces of each blade 40 being maintained in oil-tight contact, respectively, with the inner eccentric periphery of ring 37 and the inner surfaces of plates 36. Through the center of each plate 36 is formed an eccentric opening 42 which does not extend to the bottoms of said slots 41 so that the plates 36 also confine the oil in the slots 41 from escaping through the opening 42 in each plate 36.

Figure 2:
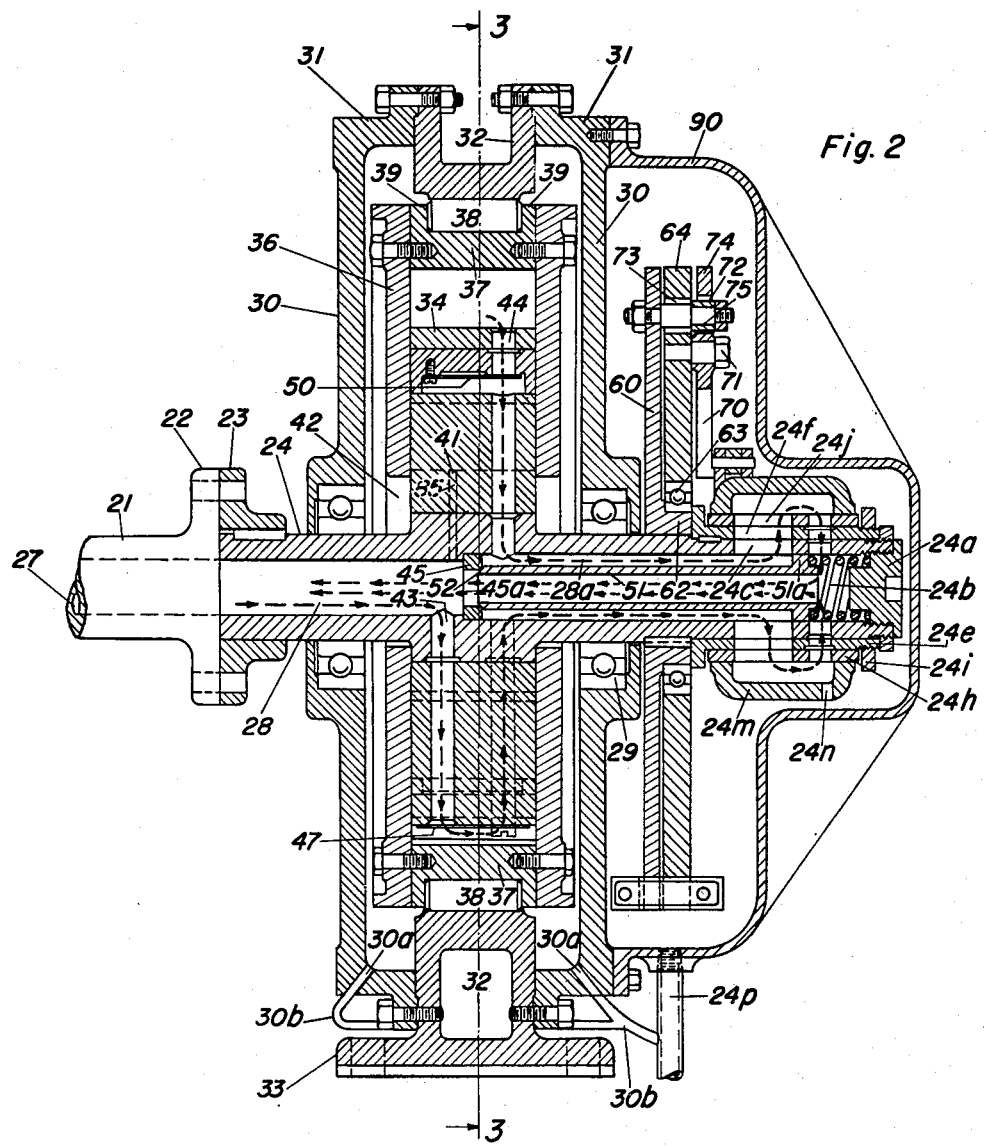
Fig. 2 is an enlarged sectional elevation view on line 2—2 of Fig. 1.

In the space on disc 34 between each pair of blades 40 are two radial openings 43, 44, extending from the periphery of disc 34 into the longitudinal tubular hollow bore 28 of shaft 24. Said openings 42 and 43 are in different transverse planes in the thickness of the disc 34, as shown in Fig. 2, to conserve the strength of the material of disc 34, as well as to place openings 43 and 44 upon opposite sides of the annular valve seat 45 mounted in the hollow bore 28 of shaft 24 in the approximate center of the width of disc 34. The opening 43 takes the oil from the hollow bore 28 of shaft 24 to the space between disc 34 and ring 37 and the pair of blades 40, past the valve 46 which, in the instance shown in Figs. 2, 3, comprises a flat spring 47 mounted in recess 48 in the periphery of disc 34, with one end extending over the outer end of opening 43, and the other end of said spring 47 secured to disc 34 by screw 49. Each opening 44 takes the oil from the space between the pair of blades 40 and the adjacent peripheries of disc 34 and ring 37, passing the same through valve 50 near the outer end of opening 44 and thence into the hollow bore 28 of shaft 24 upon the side of said valve seat 45 opposite to the side thereof on which said opening 43 enters. The valve 50 is shown enlarged in Figs. 7, 8 and 9, and is constructed similarly to the heretofore described valve 46, the difference between said valves 46 and 50 being that they open in opposite directions.

Figure 4:
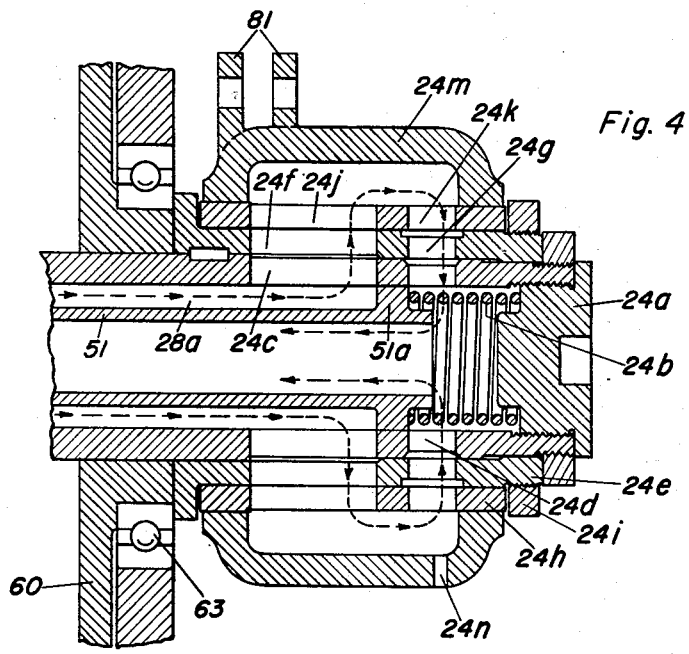
Fig. 4 is an enlarged sectional view of the parts shown in the right central projecting portion of Fig. 2.

In the outer end of the hollow bore 28 of shaft 24 extends a tube 51 having a seat 52 on its inner end adapted to normally seal the opening 45a, through valve seat 45, from communication with annular portion 28a of hollow bore 28 of shaft 24 that surrounds tube 51. Each opening 44 discharges into said portion 28a along which the discharged oil flows until it contacts shoulder 51a, Figs. 2, 4, rigid upon and near the outer end of tube 51. In the outer end of shaft 24 is screwed a plug 24a having a central projection loosely entering one end of spring 24b whose opposite end contacts with shoulder 51a to normally maintain the seal of seat 52 against valve seat 45. Upon the inner side of shoulder 51a a plurality of rectangular slots 24c are formed at brief, spaced intervals extending about the shaft 24, while upon the spring side of shoulder 51a a series of round openings 24d are formed through shaft 24 at spaced intervals extending thereabout.

Figure 5:
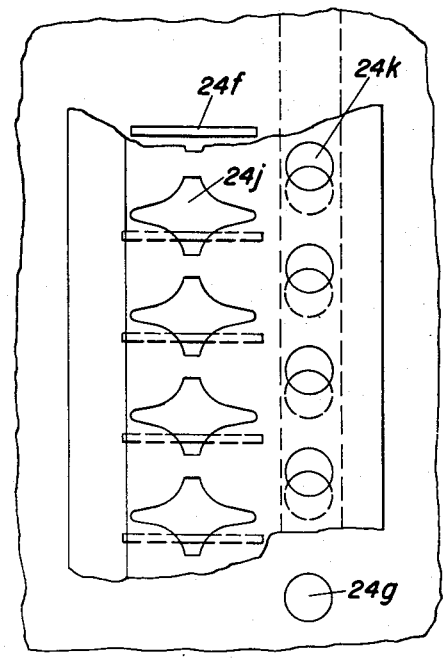
Fig. 5 is an enlarged plan view of a portion of the peripheral registerable valve surfaces of Fig. 4 extending in a flat plane for illustrative clarity.

A sleeve 24e, made of wear resistant metal, is rigidly secured to shaft 24 so as to cover an area including that occupied by said openings 24c and 24d, in such position that its narrow openings 24f and its cylindrical openings 24g, respectively, register at all times with said openings 24c and 24d. Surrounding sleeve 24e is a second sleeve 24h, also of wear resistant metal, revolvably confined upon said sleeve 24e by ring 24i, adjustably mounted upon sleeve 24e by screw threads, or otherwise, to compensate for wear. Extending through the second sleeve 24h are two series of opening 24j and 24 k. The openings of the 24k series are, in the instance shown in Fig. 5, cylindrical and of the size and spacing of the openings 24g. Each opening of the 24j series is irregular in form, having relatively narrow opposite ends of substantially the width and outer extent of its corresponding opening 24f. As each opening 24j extends toward its center, its area increases progressively, and at its center it is widest and of uniform width for a short distance. Surrounding and rigidly attached at opposite ends to opposite ends of said second sleeve 24h, is an annular casing 24m, whose wall is substantially C-shaped.

Intermediate the inner end of sleeve 24e and the adjacent plate 30 is a disc 60 rigidly mounted upon shaft 24 and provided with a hub 62, provided with bearings 63, supporting a second disc 64. At a plurality of equidistant points, said discs 60 and 64 are connected together with springs. In the instance shown in Figs. 6 and 6A, each spring is formed of a plurality of thin, flat strips of spring steel 65, extending lengthwise through a slot 66 in said discs 60 and 64. Each spring unit is secured at opposite ends to projections 67, 68, rigidly mounted upon the respective discs 60 and 64.

A lever 70 is fulcrumed intermediate its ends by a stud 71 rigidly secured near the outer edge of disc 64. Rigidly secured near the outer edge of disc 60 and near the outer end of lever 70 is a stud bolt 72, which extends through a larger opening 73 in disc 64 and into an elongated opening 74 near the outer end of lever 70, a roller 75 being upon the outer end of stud bolt 72 and provided with a bearing on the walls of opening 74. The lower end of lever 70 below its fulcrum 71 is provided with a plurality of spaced apart openings 76, extending therethrough, in either of which is adapted to be temporarily secured a stud 77 having a transverse opening extending therethrough near its outer end and adapted to receive a screw-threaded rod 78 having lock nuts 79 thereon and adapted to contact opposite sides of said stud 77 to secure rod 78 to said stud 77.

One end of rod 78 is connected by pivot pin 80 between a pair of lugs 81 projecting from said casing 24m.

In Fig. 6B, the spring 65 is shown as a coiled or corrugated spring 65a, whose opposite ends are secured similarly to the spring 65, shown in Fig. 6A.

A passageway 85, Figs. 2 and 3, extends from the bottom of each slot 41 in disc 34 to the hollow bore 28 of shaft 24 intermediate valve seat 45 and the adjacent end of crankshaft 21 to supply oil under pressure against the inner edge of each blade 40 to maintain the outer edge thereof with slight pressure against the inner wall of eccentric ring 37.

A casing 90 imperviously encases the mechanism to the right of the righthand plate 30 in Fig. 2, and which casing 90 is secured by screws, or otherwise, to the periphery of said plate 30. Through casing 24m extends at least one oil drain opening 24n, Figs. 2 and 4, which, in operation, drains some oil into the casing 90, from the bottom of which extends a run-off pipe 24p, which may drain into the crankcase of motor 20, while adjacent base 33 each plate 30 is provided with a drain-off opening 30a, which may lead by pipes 30b to pipe 24p.

When the motor 20 is operating, free from torsional vibrations of harmful degree, its oil pump 26 is pumping oil to lubricate the various bearings thereof, as well as to the hollows 27 and 28 of shafts 21 and 24.

During the operation of the motor 20, its pump 26 forces oil from its crankcase to the different bearings, some of which are supplied through the hollow bore 27 of its crankshaft 21. Some of the oil in said bore 27 flows into bore 28 of shaft 24, thence outwardly through each opening 43 of disc 37, thence through valve 46, Figs. 2, 3, into the spaces each of which is bounded on its ends by the juxtaposed pair of blades 40, and on its sides by the juxtaposed surfaces of disc 34, ring 37, and plates 30, thence into each opening 44, through its valve 50, the remainder of opening 44 into annular space 28a within the hollow bore 28 of shaft 24, which space 28a surrounds tube 51: thence the oil flows outwardly through the openings 24c through the wall of shaft 24, thence through the registering openings 24f and 24j into the annular space within casing 24m, thence inwardly through the registering openings 24k, 24j, and 24d; thence between the coils of spring 24b and into the adjacent end of the hollow bore of tube 51; thence through the central opening 45a extending through valve seat 45, and thence into the hollow bore 28 of shaft 24, where the same mingles with the oil supplied thereto from hollow bore 27 of crankshaft 21. The oil thus returned from the hollow bore of tube 51 to said hollow bore 28 of shaft 24 is minus the leakage provided through opening 24n in casing 24m, which leakage is received by the casing 90, Fig. 2, and drains into pipe 24p.

The mechanism contained between plates 30 constitutes a constant displacement pump. This pump develops torsional forces tending to oppose and eliminate vibration in the shaft 24 in two ways. When vibration occurs in shaft 24, disc 34, being rigidly secured thereto, vibrates in the same manner. However, ring 37 and plates 36 being freely rotatable on bearings 38 tend to continue rotation at a constant speed. This results in relative movement between the freely rotating parts of the pump and those fixed to shaft 24. The friction between the blades 40 and ring 37 plus the viscosity of the oil in the space between disc 34 and ring 37 tend to eliminate the above-mentioned relative movement by imparting counteracting torsional forces to the vibrating parts of the pump and thus to shaft 24.

However, the major part of the vibration damping action is developed in another manner. The disc 60, being rigidly secured to shaft 24, vibrates with it. The disc 64, on the other hand, tends to continue rotating at a uniform rotational velocity. This results in relative vibratory motion between discs 60 and 64. This relative motion is proportional to the magnitude of the vibration of shaft 24, and is communicated to the lever 70 which magnifies it and communicates the magnified motion to casing 24m and sleeve 24h secured thereto. Thus the diamond shaped openings or ports 24j in sleeve 24h move with vibration frequency relative to the rectangular slots or openings 24f in sleeve 24e.

When there is no vibration the longitudinal axes of the openings 24f and 24j coincide. As has been stated, these openings are in the discharge line of the constant displacement pump. The openings presented, and hence the effective aggregate orifice area, depends upon the relative position of openings 24f and 24j. The greater the vibration the smaller the area of the orifice through which the fluid discharged by the pump must flow. Thus, when a vibration is encountered, the sleeve 24h vibrates back and forth about its mean or no vibration position, and twice each vibration cycle, the aggregate orifice area through which the working fluid is pumped changes from maximum to minimum and again to maximum. At any moment in a vibration cycle, the pressure against which the fluid is being pumped depends, among other factors, upon the reciprocal of the square of the aggregate orifice area through which the fluid is being pumped. As the sleeve 24h reduces the orifice area, the pressure increases. It is thus apparent that each half vibration cycle, the pressure in the pump goes through a cycle of variation. Furthermore, the maximum pressure attained depends upon the amplitude of vibration; the greater the maximum travel of the sleeve 24h, the smaller the orifice area and consequently the greater the maximum pressure during the half cycle. It should be noted that the positive displacement pump delivers fluid at a constant rate, while the pressure is variable.

The tube 51 acts as a pressure relief valve to insure against the occurrence of dangerous pressures in the system. When the pressure in the annular chamber 28a exceeds a certain value the tube 51 is moved to the right against the action of spring 24b and sufficient of the fluid in the chamber escapes through opening 45a into the space 28 which constitutes the suction chamber of the constant displacement pump.

When extremely severe vibrations are encountered the discharge orifice may be completely closed and the maximum pressure for the vibration cycle maintained at a value corresponding to the setting of the relief valve. By proper setting of the relief valve another manner of utilizing the damping means is provided in which the orifice is blocked off completely twice each vibration cycle and pumping is effected through the spring loaded relief valve.

By proper choice of openings in the sleeves 24h and 24e and adjustment of the magnifying lever 70, the energy adsorption of the damping means may be adjusted over a considerable range. Thus if greater damping is required the magnifying lever 70 is adjusted to give greater motion to sleeve 24h and greater energy dissipation results.

While the description of the invention has been devoted exclusively to the embodiment shown in the accompanying drawings, the general principle employed is susceptible to various embodiments. Thus, it may be applied through the use of electrical apparatus or by periodically varying the pressure on a friction dynamometer. The system readily lends itself to remote control by locating the vibration measuring means at a point of greater vibration, while the pump or other means of applying correcting forces may be located at any point in the shafting.

The invention is not to be restricted to the details of the specific embodiment disclosed, but only by the scope of the accompanying claims.

The invention described herein may be manufactured and used by or for the Government of the United States of America for governmental purposes without the payment of any royalties thereon or therefor.

Having described my invention, what I claim as new and desire to secure by Letters Patent is:

1. Means for damping torsional vibration in a rotating power transmitting mechanism comprising a constant displacement fluid pump having an element driven directly from the power transmitting mechanism, said pump having a variable discharge orifice, a first member fixed to the rotating power transmitting mechanism to rotate therewith, a second member journalled on said mechanism for rotation with respect thereto, means flexibly connecting said two members to permit limited relative movement therebetween, a lever pivotally attached to said second member, said lever having two arms of different lengths, a pivotal connection between the shorter arm of said lever and said first member, means for varying the area of said variable discharge orifice, and means adjustably connecting said area varying means to the longer arm of said two-armed lever, whereby vibrational movements occurring in said first member are transmitted to said area varying means to vary the area of said discharge orifice in accordance with the amplitude of the vibrations and thereby vary the pressure in the discharge side of said pump in the same manner.

2. Means for damping torsional vibrations in a rotating power transmitting mechanism comprising a constant displacement pump driven directly by said mechanism, and having a variable discharge orifice, and means for varying the pressure in the discharge side of said pump in proportion to the magnitude of torsional vibrations occurring in said mechanism, said means comprising means for reproducing said vibrations, and means actuated by said reproducing means for varying the area of said discharge orifice in accordance with the amplitude of said vibrations.

3. Means for damping torsional vibrations in a rotating power transmitting mechanism comprising a constant displacement pump having a rotating element forming a part of the power transmitting mechanism, means for reproducing torsional vibrations occurring in the mechanism, and means for varying the pressure in the discharge side of said pump in accordance with the amplitude of the vibrations.

4. Means for damping torsional vibrations in a rotating power transmitting mechanism comprising a constant displacement pump driven by said mechanism, said pump having a variable discharge orifice, means for reproducing the torsional vibrations of the power transmitting mechanism, and means for varying the area of said discharge orifice in accordance with the amplitude of the reproduced vibrations.

5. In combination with a rotating power transmitting element, a constant delivery fluid pumping means forming an integral part of said element, means to reproduce torsional vibrations occurring in said element and means to vary the pressure in the discharge side of said pumping means in accordance with the amplitude of said vibrations.

6. In a means for damping torsional vibrations in a rotating power transmitting mechanism which comprises a constant displacement pump having a rotating part directly driven from said mechanism; means for varying the pressure in the discharge side of the pump, comprising means for varying the area of the discharge orifice thereof, means for reproducing vibrations occurring in the mechanism and means connecting said orifice varying means to said vibration reproducing means whereby said orifice area is reduced in accordance with the amplitude of the vibrations.

7. Means for damping torsional vibrations in a rotating mechanism, comprising means normally supplying a constant rotational drag to said mechanism, means for reproducing the vibrations occurring in said mechanism and means controlled by said reproducing means for variably increasing the drag in accordance with the amplitude of the vibrations.

8. Means for damping torsional vibrations in a rotating element, comprising a constant displacement pump, said pump having a rotor mounted integrally on said element and acting as a flywheel thereon, a discharge orifice in the discharge side of said pump, means for reproducing vibrations occurring in said element, means for varying the area of said discharge orifice and means connecting said vibration reproducing means to drive said area varying means in such a manner as to develop pressure pulsations in the discharge side of said pump corresponding in frequency and in a proper phase relation to the vibrations occurring in said element, the magnitude of said pressure pulsations varying in accordance with the amplitude of the vibrations occurring in the rotating element.

GEORGE JOSEPH DASHEFSKY.